United States Patent
Zhao et al.

(10) Patent No.: US 11,251,718 B2
(45) Date of Patent: Feb. 15, 2022

(54) ACTIVE RECTIFIER BRIDGE CIRCUIT AND ON-CHIP INTEGRATED SYSTEM

(71) Applicant: SHANGHAI NATLINEAR ELECTRONICS CO., LTD., Shanghai (CN)

(72) Inventors: Shouquan Zhao, Shanghai (CN); Guizhi Liu, Shanghai (CN); Yao Zhou, Shanghai (CN); Xiaoqiang Jiang, Shanghai (CN)

(73) Assignee: SHANGHAI NATLINEAR ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 17/198,609

(22) Filed: Mar. 11, 2021

(65) Prior Publication Data

US 2021/0376756 A1   Dec. 2, 2021

(30) Foreign Application Priority Data

May 28, 2020   (CN) .......................... 202010464660.0

(51) Int. Cl.
*H02M 7/219*   (2006.01)
*H02M 1/08*   (2006.01)

(52) U.S. Cl.
CPC .............. *H02M 7/219* (2013.01); *H02M 1/08* (2013.01)

(58) Field of Classification Search
CPC ......... H02M 7/219; H02M 2001/0006; H02M 1/0006; H02M 1/08; H03K 17/687; H03K 17/693; H03K 17/04
See application file for complete search history.

(56) References Cited

U.S. PATENT DOCUMENTS

| | | | | |
|---|---|---|---|---|
| 8,427,113 B2* | 4/2013 | Xing | ....................... | H02M 3/07 320/145 |
| 8,804,389 B2* | 8/2014 | Heath | ..................... | H02M 1/38 363/89 |
| 9,350,263 B2* | 5/2016 | Tang | ..................... | H02M 7/219 |
| 10,381,915 B1* | 8/2019 | Dusmez | ................ | H02M 1/083 |

(Continued)

FOREIGN PATENT DOCUMENTS

| CN | 109600062 A | 4/2019 |
|---|---|---|
| CN | 110545047 A | 12/2019 |

*Primary Examiner* — Gustavo A Rosario-Benitez
(74) *Attorney, Agent, or Firm* — Global IP Services; Tianhua Gu (57) ABSTRACT

An active rectifier bridge circuit and an on-chip integrated system. The active rectifier bridge circuit includes: a bias module, configured to provide a first bias current source, a second bias current source, and an internal power supply for a gate driver module; the gate driver module controlled by the first bias current source, the second bias current source, and the internal power supply, and configured to process one group of alternating current input voltages to generate two groups of control signals that are mutually inverted, to generate four gate drive signals; a power switch tube rectification module, connected to the bias module and the gate driver module, configured to: perform a turn-on or turn-off operation on corresponding power switch tubes under the control of the four gate drive signals, and convert the one group of alternating current input voltages into a direct current output voltage for output.

11 Claims, 5 Drawing Sheets

(56) References Cited

U.S. PATENT DOCUMENTS

| | | | |
|---|---|---|---|
| 2011/0199799 A1* | 8/2011 | Hui | H02M 7/217 363/127 |
| 2013/0176758 A1* | 7/2013 | Tseng | H02M 7/219 363/89 |
| 2013/0235635 A1* | 9/2013 | Takahagi | H02M 7/219 363/127 |
| 2014/0268956 A1 | 9/2014 | Teren et al. | |
| 2017/0149353 A1* | 5/2017 | Hung | H02M 1/08 |
| 2017/0302193 A1* | 10/2017 | Zhang | H02M 7/219 |
| 2017/0302194 A1* | 10/2017 | Zhang | H02M 7/219 |
| 2018/0097451 A1* | 4/2018 | Morin | H02M 7/219 |
| 2018/0287506 A1* | 10/2018 | Gadler | H02M 1/08 |
| 2019/0267791 A1* | 8/2019 | Creech | H02H 3/093 |
| 2019/0326810 A1* | 10/2019 | Hashimoto | H02M 1/4233 |
| 2020/0195164 A1* | 6/2020 | Zhan | H02J 50/00 |
| 2021/0036630 A1* | 2/2021 | Peng | H02M 1/32 |
| 2021/0111639 A1* | 4/2021 | Lai | H02M 1/08 |

\* cited by examiner

ACTIVE RECTIFIER BRIDGE CIRCUIT AND ON-CHIP INTEGRATED SYSTEM

BACKGROUND OF THE PRESENT INVENTION

Field of Invention

The present invention relates to a power supply system, and in particular, to an active rectifier bridge circuit and an on-chip integrated system.

Description of Related Arts

A rectifier bridge is widely applied to an alternating current power supply system and a non-polar power supply system, and the rectifier bridge is configured to convert an alternating current voltage or a non-polar voltage into a direct current voltage for output.

Figure 1:
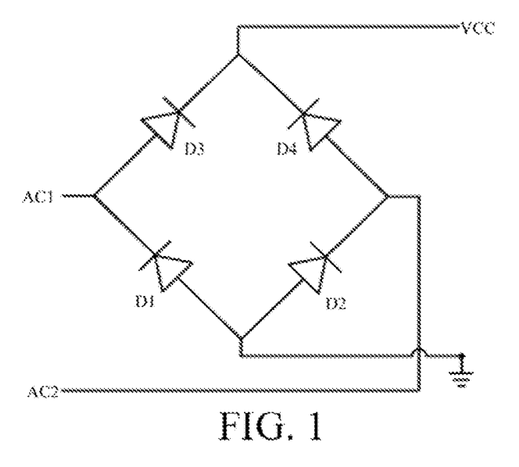
FIG. 1 is a specific circuit diagram of an existing off-clip rectifier bridge.

An off-chip rectifier bridge is generally applied to the alternating current power supply system and the non-polar power supply system. As shown in FIG. 1, the off-chip rectifier bridge is composed of four discrete device diodes, or four diode chips sealed together. However, because of existence of inherent voltage drop (approximately 0.6 V) of the diodes, there is a large power loss in a rectification solution formed based on a plurality of diodes, and a system temperature rises sharply.

Therefore, to reduce the power loss and improve the system integration degree, the technology of a small power active on-chip integrated rectifier bridge becomes very necessary.

SUMMARY OF THE PRESENT INVENTION

In view of the foregoing disadvantages in the prior art, an object of the present invention is to provide an active rectifier bridge circuit and an on-chip integrated system, to resolve the problem of a relatively large power loss and a relatively low system integration degree in an existing off-chip rectifier bridge composed of four diodes.

To achieve the foregoing object and other related objects, the present invention provides an active rectifier bridge circuit, comprising: a bias module, a gate driver module, and a power switch tube rectification module, wherein the bias module is configured to provide a first bias current source, a second bias current source, and an internal power supply for the gate driver module;

the gate driver module is connected to the bias module, is controlled by the first bias current source, the second bias current source, and the internal power supply, and is configured to: process one group of alternating current input voltages to generate two groups of control signals that are mutually inverted, and generate four gate drive signals based on the two groups of control signals that are mutually inverted; and the power switch tube rectification module is connected to the bias module and the gate driver module, comprises two NMOS power switch tubes and two PMOS power switch tubes, and is configured to: perform a turn-on or turn-off operation on corresponding power switch tubes under the control of the four gate drive signals, and convert the one group of alternating current input voltages into a direct current output voltage for output.

Optionally, the power switch tube rectification module comprises: a first NMOS power switch tube, a second NMOS power switch tube, a first PMOS power switch tube, a second PMOS power switch tube, a first pull-down resistor, a second pull-down resistor, a first pull-up resistor, and a second pull-up resistor, wherein a gate terminal of the first NMOS power switch tube is connected to a first output end of the gate driver module and one end of the first pull-down resistor, the other end of the first pull-down resistor is grounded, a source terminal of the first NMOS power switch tube is grounded, a drain terminal of the first NMOS power switch tube is connected to a drain terminal of the first PMOS power switch tube, and is used as a first input end of the power switch tube rectification module, a gate terminal of the second NMOS power switch tube is connected to a second output end of the gate driver module and one end of the second pull-down resistor, the other end of the second pull-down resistor is grounded, a source terminal of the second NMOS power switch tube is grounded, a drain terminal of the second NMOS power switch tube is connected to a drain terminal of the second PMOS power switch tube, and is used as a second input end of the power switch tube rectification module, a gate terminal of the first PMOS power switch tube is connected to a third output end of the gate driver module and one end of the first pull-up resistor, a gate terminal of the second PMOS power switch tube is connected to a fourth output end of the gate driver module and one end of the second pull-up resistor, and the other end of the first pull-up resistor is connected to a source terminal of the first PMOS power switch tube, the other end of the second pull-up resistor, a source terminal of the second PMOS power switch tube, the bias module, and the gate driver module, and is used as an output end of the power switch tube rectification module.

Optionally, the gate driver module comprises: an alternating current level determining unit, a gate drive unit of the PMOS power switch tube, and a gate drive unit of the NMOS power switch tube, wherein the alternating current level determining unit is controlled by the internal power supply, and is configured to: compare a first alternating current input voltage with a second alternating current input voltage in the one group of alternating current input voltages, and perform logical operation processing on a comparison result and a delay of the comparison result, to generate two groups of control signals that are mutually inverted;

the gate drive unit of the PMOS power switch tube is connected to the alternating current level determining unit and the power switch tube rectification module, is controlled by the first bias current source, and is configured to: generate gate drive signals of the two PMOS power switch tubes under the control of the two groups of control signals that are mutually inverted; and the gate drive unit of the NMOS power switch tube is connected to the alternating current level determining unit, the gate drive unit of the PMOS power switch tube, and the power switch tube rectification module, is controlled by the second bias current source, and is configured to: generate gate drive signals of the two NMOS power switch tubes under the control of the two groups of control signals that are mutually inverted and the gate drive signals of the two PMOS power switch tubes.

Optionally, the alternating current level determining unit comprises: a first alternating current level determining part and a second alternating current level determining part, wherein the first alternating current level determining part comprises: a first comparator, a first delayer, a first NOR gate, and a first phase inverter, wherein an in-phase input end of the first comparator accesses the first alternating current input voltage, an inverting input end of the first comparator accesses the second alternating current input voltage, an output end of the first comparator is connected to an input end of the first delayer and a first input end of the first NOR gate, an output end of the first delayer is connected to a second input end of the first NOR gate, an output end of the first NOR gate is connected to an input end of the first phase inverter, and is used as a first output end of the alternating current level determining unit, and an output end of the first phase inverter is used as a second output end of the alternating current level determining unit; and the second alternating current level determining part comprises: a second comparator, a second delayer, a second NOR gate, and a second phase inverter, wherein an in-phase input end of the second comparator accesses the second alternating current input voltage, an inverting input end of the second comparator accesses the first alternating current input voltage, an output end of the second comparator is connected to an input end of the second delayer and a first input end of the second NOR gate, an output end of the second delayer is connected to a second input end of the second NOR gate, an output end of the second NOR gate is connected to an input end of the second phase inverter, and is used as a third output end of the alternating current level determining unit, and an output end of the second phase inverter is used as a fourth output end of the alternating current level determining unit, wherein a delay time of the first delayer is the same as a delay time of the second delayer, and the first NOR gate, the second NOR gate, the first phase inverter, and the second phase inverter are all controlled by the internal power supply.

Optionally, the gate drive unit of the PMOS power switch tube comprises: a PMOS voltage regulation part, a gate drive part of the first PMOS power switch tube, and a gate drive part of the second PMOS power switch tube, wherein the PMOS voltage regulation part is configured to provide a first clamping voltage for the gate drive part of the first PMOS power switch tube and the gate drive part of the second PMOS power switch tube;

the gate drive part of the first PMOS power switch tube is connected to the PMOS voltage regulation part, the alternating current level determining unit, and the power switch tube rectification module, is controlled by the first bias current source, and is configured to: generate, based on the accessed direct current output voltage, a gate drive signal that turns off the first PMOS power switch tube, or generate, based on the accessed first clamping voltage, a gate drive signal that turns on the first PMOS power switch tube, under the control of one group of control signals that are mutually inverted and that are outputted by a third output end and a fourth output end of the alternating current level determining unit; and the gate drive part of the second PMOS power switch tube is connected to the PMOS voltage regulation part, the alternating current level determining unit, and the power switch tube rectification module, is controlled by the first bias current source, and is configured to: generate, based on the accessed direct current output voltage, a gate drive signal that turns off the second PMOS power switch tube, or generate, based on the accessed first clamping voltage, a gate drive signal that turns on the second PMOS power switch tube, under the control of one group of control signals that are mutually inverted and that are outputted by a first output end and a second output end of the alternating current level determining unit.

Optionally, the PMOS voltage regulation part comprises a first voltage regulator tube, wherein a cathode terminal of the first voltage regulator tube accesses the direct current output voltage, and an anode terminal of the first voltage regulator tube is used as an output end of the PMOS voltage regulation part.

Optionally, the gate drive part of the first PMOS power switch tube comprises: a first NMOS tube, a second NMOS tube, a third NMOS tube, a first PMOS tube, a second PMOS tube, a third PMOS tube, a fourth PMOS tube, a fifth PMOS tube, and a sixth PMOS tube, wherein a source terminal of the first NMOS tube, a source terminal of the second NMOS tube, and a source terminal of the third NMOS tube are all grounded, a gate terminal of the first NMOS tube is connected to the fourth output end of the alternating current level determining unit, a drain terminal of the first NMOS tube is connected to a drain terminal of the first PMOS tube, a gate terminal of the second NMOS tube is connected to a gate terminal of the third NMOS tube, and is simultaneously connected to the third output end of the alternating current level determining unit, a drain terminal of the second NMOS tube is connected to a drain terminal of the second PMOS tube, a drain terminal of the third NMOS tube is connected to a drain terminal of the third PMOS tube, a gate terminal of the first PMOS tube, a gate terminal of the second PMOS tube, and a gate terminal of the third PMOS tube are all connected to an output end of the PMOS voltage regulation part, and are controlled by the first bias current source, a source terminal of the first PMOS tube is connected to a drain terminal of the fourth PMOS tube, a source terminal of the second PMOS tube is connected to a drain terminal of the fifth PMOS tube, a source terminal of the third PMOS tube is connected to a drain terminal of the sixth PMOS tube, and is used as an output end of the gate drive part of the first PMOS power switch tube, a source terminal of the fourth PMOS tube, a source terminal of the fifth PMOS tube, and a source terminal of the sixth PMOS tube all access the direct current output voltage, a gate terminal of the fourth PMOS tube is connected to the drain terminal of the fifth PMOS tube, a gate terminal of the fifth PMOS tube is connected to the drain terminal of the fourth PMOS tube, and a gate terminal of the sixth PMOS tube is connected to the source terminal of the first PMOS tube.

Optionally, the gate drive part of the second PMOS power switch tube comprises: a fourth NMOS tube, a fifth NMOS tube, a sixth NMOS tube, a seventh PMOS tube, an eighth PMOS tube, a ninth PMOS tube, a tenth PMOS tube, an eleventh PMOS tube, and a twelfth PMOS tube, wherein a source terminal of the fourth NMOS tube, a source terminal of the fifth NMOS tube, and a source terminal of the sixth NMOS tube are all grounded, a gate terminal of the fourth NMOS tube is connected to the second output end of the alternating current level determining unit, a drain terminal of the fourth NMOS tube is connected to a drain terminal of the seventh PMOS tube, a gate terminal of the fifth NMOS tube is connected to a gate terminal of the sixth NMOS tube, and is simultaneously connected to the first output end of the alternating current level determining unit, a drain terminal of the fifth NMOS tube is connected to a drain terminal of the eighth PMOS tube, a drain terminal of the sixth NMOS tube is connected to a drain terminal of the ninth PMOS tube, a gate terminal of the seventh PMOS tube, a gate terminal of the eighth PMOS tube, and a gate terminal of the ninth PMOS tube are all connected to an output end of the PMOS voltage regulation part, and are controlled by the first bias current source, a source terminal of the seventh PMOS tube is connected to a drain terminal of the tenth PMOS tube, a source terminal of the eighth PMOS tube is connected to a drain terminal of the eleventh PMOS tube, a source terminal of the ninth PMOS tube is connected to a drain terminal of the twelfth PMOS tube, and is used as an output end of the gate drive part of the second PMOS power switch tube, a source terminal of the tenth PMOS tube, a source terminal of the eleventh PMOS tube, and a source terminal of the twelfth PMOS tube all access the direct current output voltage, a gate terminal of the tenth PMOS tube is connected to the drain terminal of the eleventh PMOS tube, a gate terminal of the eleventh PMOS tube is connected to the drain terminal of the tenth PMOS tube, and a gate terminal of the twelfth PMOS tube is connected to the source terminal of the seventh PMOS tube.

Optionally, the gate drive unit of the NMOS power switch tube comprises: an NMOS voltage regulation part, a gate drive part of the first NMOS power switch tube, and a gate drive part of the second NMOS power switch tube, wherein the NMOS voltage regulation part is configured to provide a second clamping voltage for the gate drive part of the first NMOS power switch tube and the gate drive part of the second NMOS power switch tube;

the gate drive part of the first NMOS power switch tube is connected to the NMOS voltage regulation part, the alternating current level determining unit, the gate drive unit of the PMOS power switch tube, and the power switch tube rectification module, is controlled by the second bias current source, and is configured to: generate, based on the accessed second clamping voltage, a gate drive signal that turns off or on the first NMOS power switch tube, under the control of a control signal outputted by a second output end of the alternating current level determining unit and a gate drive signal of the second PMOS power switch tube outputted by the gate drive unit of the PMOS power switch tube; and the gate drive part of the second NMOS power switch tube is connected to the NMOS voltage regulation part, the alternating current level determining unit, the gate drive unit of the PMOS power switch tube, and the power switch tube rectification module, is controlled by the second bias current source, and is configured to: generate, based on the accessed second clamping voltage, a gate drive signal that turns off or on the second NMOS power switch tube, under the control of a control signal outputted by a fourth output end of the alternating current level determining unit and a gate drive signal of the first PMOS power switch tube outputted by the gate drive unit of the PMOS power switch tube.

Optionally, the NMOS voltage regulation part comprises: a second voltage regulator tube, wherein an anode terminal of the second voltage regulator tube is grounded, and a cathode terminal of the second voltage regulator tube is used as an output end of the NMOS voltage regulation part.

Optionally, the gate drive part of the first NMOS power switch tube comprises: a thirteenth PMOS tube, a seventh NMOS tube, an eighth NMOS tube, a ninth NMOS tube, a tenth NMOS tube, a third pull-up resistor, a third voltage regulator tube, a fourth voltage regulator tube, and a third phase inverter, wherein a gate terminal of the thirteenth PMOS tube accesses the gate drive signal of the second PMOS power switch tube outputted by the gate drive unit of the PMOS power switch tube, a source terminal of the thirteenth PMOS tube accesses the direct current output voltage, a drain terminal of the thirteenth PMOS tube is connected to a drain terminal of the seventh NMOS tube, a gate terminal of the seventh NMOS tube is connected to an output end of the NMOS voltage regulation part, and is controlled by the second bias current source, a source terminal of the seventh NMOS tube is connected to a drain terminal of the eighth NMOS tube, a cathode terminal of the third voltage regulator tube, an input end of the third phase inverter, a gate terminal of the ninth NMOS tube, and one end of the third pull-up resistor, a gate terminal of the eighth NMOS tube is connected to a second output end of the alternating current level determining unit, a source terminal of the eighth NMOS tube is grounded, an anode terminal of the third voltage regulator tube is grounded, an output end of the third phase inverter is connected to a gate terminal of the tenth NMOS tube, a drain terminal of the ninth NMOS tube is connected to the other end of the third pull-up resistor, and simultaneously accesses the second alternating current input voltage, a source terminal of the ninth NMOS tube is connected to a cathode terminal of the fourth voltage regulator tube and a drain terminal of the tenth NMOS tube, and is used as an output end of the gate drive part of the first NMOS power switch tube, and a source terminal of the tenth NMOS tube is grounded.

Optionally, the gate drive part of the second NMOS power switch tube comprises: a fourteenth PMOS tube, an eleventh NMOS tube, a twelfth NMOS tube, a thirteenth NMOS tube, a fourteenth NMOS tube, a fourth pull-up resistor, a fifth voltage regulator tube, a sixth voltage regulator tube, and a fourth phase inverter, wherein a gate terminal of the fourteenth PMOS tube accesses the gate drive signal of the first PMOS power switch tube outputted by the gate drive unit of the PMOS power switch tube, a source terminal of the fourteenth PMOS tube accesses the direct current output voltage, a drain terminal of the fourteenth PMOS tube is connected to a drain terminal of the eleventh NMOS tube, a gate terminal of the eleventh NMOS tube is connected to an output end of the NMOS voltage regulation part, and is controlled by the second bias current source, a source terminal of the eleventh NMOS tube is connected to a drain terminal of the twelfth NMOS tube, a cathode terminal of the fifth voltage regulator tube, an input end of the fourth phase inverter, a gate terminal of the thirteenth NMOS tube, and one end of the fourth pull-up resistor, a gate terminal of the twelfth NMOS tube is connected to a fourth output end of the alternating current level determining unit, a source terminal of the twelfth NMOS tube is grounded, an anode terminal of the fifth voltage regulator tube is grounded, an output end of the fourth phase inverter is connected to a gate terminal of the fourteenth NMOS tube, a drain terminal of the thirteenth NMOS tube is connected to the other end of the fourth pull-up resistor, and simultaneously accesses the first alternating current input voltage, a source terminal of the thirteenth NMOS tube is connected to a cathode terminal of the sixth voltage regulator tube and a drain terminal of the fourteenth NMOS tube, and is used as an output end of the gate drive part of the second NMOS power switch tube, and a source terminal of the fourteenth NMOS tube is grounded.

The present invention further provides an on-chip integrated system, comprising: the active rectifier bridge circuit described above and a functional circuit connected to an output end of the active rectifier bridge circuit, wherein the active rectifier bridge circuit provides a working voltage for the functional circuit, and the active rectifier bridge circuit and the functional circuit are formed on the same silicon wafer.

As described above, according to the active rectifier bridge circuit and the on-chip integrated system consistent with the present invention, the existing diodes are replaced with the four power switch tubes for the design of the rectifier bridge, thereby greatly reducing the power loss. In addition, in the present invention, the gate driver module controls the switch drive and time sequence of the four power switch tubes, to implement dead-time control on turn-on/off of the four power switch tubes, so that the active rectifier bridge circuit consistent with the present invention implements a safe and reliable rectification function, and rectification efficiency of the active rectifier bridge circuit is significantly improved. The active rectifier bridge circuit consistent with the present invention is implemented by using conventional process devices. Therefore, the active rectifier bridge circuit can be produced on the same silicon wafer as the functional circuit, thereby improving the product integration degree, and helping implement product miniaturization and intelligence.

REFERENCE NUMERALS 10 active rectifier bridge circuit;
100 bias module;
200 gate driver module;
201 alternating current level determining unit;
2011 first alternating current level determining part;
2012 second alternating current level determining part;
202 gate drive unit of a PMOS power switch tube;
2021 PMOS voltage regulation part;
2022 gate drive unit of a first PMOS power switch tube;
2023 gate drive unit of a second PMOS power switch tube;
203 gate drive unit of an NMOS power switch tube;
2031 NMOS voltage regulation part;
2032 gate drive unit of a first NMOS power switch tube;
2033 gate drive unit of a second NMOS power switch tube;
300 power switch tube rectification module; and
20 functional circuit.

DETAILED DESCRIPTION OF THE PREFERRED EMBODIMENTS

The following describes implementations of the present invention by using specific embodiments. A person skilled in the art may easily understand other advantages and effects of the present invention from the content disclosed in this specification. The present invention may also be implemented or applied through other different specific implementations. Various details in this specification may also be modified or changed based on different viewpoints and applications without departing from the spirit of the present invention.

Refer to FIG. 2 to FIG. 7. It should be noted that, the drawings provided in the embodiments of the present invention only exemplify the basic idea of the present invention. Although only the components related to the present invention are shown in the drawings, and are not drawn according to the quantities, shapes, and sizes of the components during actual implementation, during actual implementation, the patterns, quantities, and proportions of the components may be randomly changed, and the layout pattern of the components may be more complex.

Embodiment 1

Figure 2:
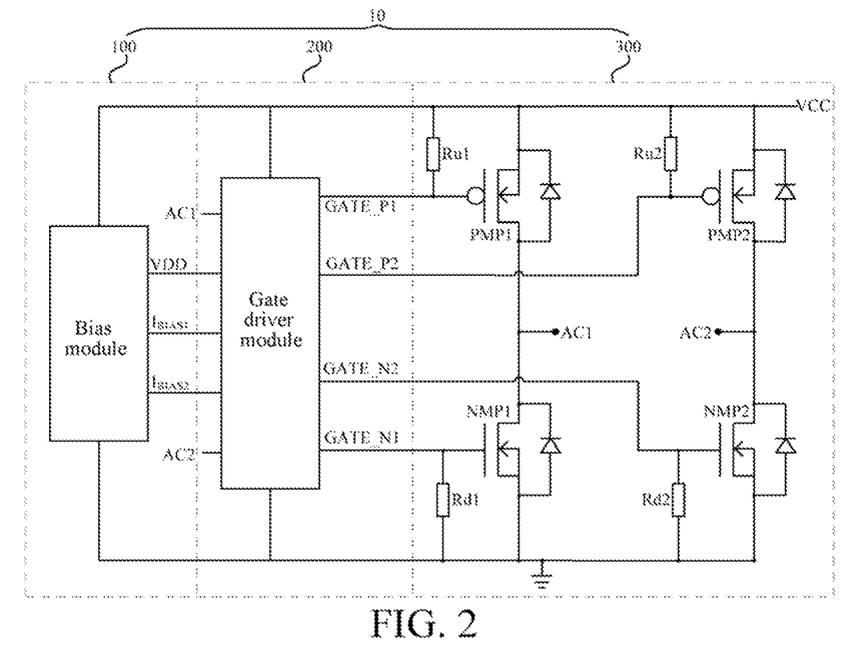
FIG. 2 is a circuit diagram of the active rectifier bridge circuit consistent with the present invention.

As shown in FIG. 2, this embodiment provides an active rectifier bridge circuit. The active rectifier bridge circuit 10 comprises: a bias module 100, a gate driver module 200, and a power switch tube rectification module 300.

The bias module 100 is configured to provide a first bias current source $I_{BIAS1}$, a second bias current source $I_{BIAS2}$, and an internal power supply VDD to the gate driver module 200.

The gate driver module 200 is connected to the bias module 100, is controlled by the first bias current source $I_{BIAS1}$, the second bias current source $I_{BIAS2}$, and the internal power supply VDD, and is configured to: process one group of alternating current input voltages AC1 and AC2 to generate two groups of control signals COMP1B, COMP1, COMP2B, and COMP2 that are mutually inverted, and generate four gate drive signals GATE_N1, GATE_N2, GATE_P1, and GATE_P2 based on the two groups of control signals COMP1B, COMP1, COMP2B, and COMP2 that are mutually inverted.

The power switch tube rectification module 300 is connected to the bias module 100 and the gate driver module 200, comprises two NMOS power switch tubes NMP1 and NMP2 and two PMOS power switch tubes PMP1 and PMP2, and is configured to: perform a turn-on or turn-off operation on the corresponding power switch tubes NMP1, NMP2, PMP1, and PMP2 under the control of the four gate drive signals GATE_N1, GATE_N2, GATE_P1, and GATE_P2, and convert the one group of alternating current input voltages AC1 and AC2 into a direct current output voltage VCC for output.

For example, as shown in FIG. 2, the bias module 100 is powered by an output end of the active rectifier bridge circuit 10, that is, is powered by the direct current output voltage VCC, and is configured to provide the first bias current source $I_{BIAS1}$, the second bias current source $I_{BIAS2}$, and the internal power supply VDD to the gate driver module 200. Specifically, the bias module 100 is any existing circuit that can generate a bias current and a power supply voltage, and a specific circuit structure of the bias module is not limited in this example.

For example, as shown in FIG. 2, the power switch tube rectification module 300 comprises: a first NMOS power switch tube NMP1, a second NMOS power switch tube NMP2, a first PMOS power switch tube PMP1, a second PMOS power switch tube PMP2, a first pull-down resistor Rd1, a second pull-down resistor Rd2, a first pull-up resistor Ru1, and a second pull-up resistor Ru2, wherein a gate terminal of the first NMOS power switch tube NMP1 is connected to a first output end of the gate driver module 200 and one end of the first pull-down resistor Rd1, the other end of the first pull-down resistor Rd1 is grounded, a source terminal of the first NMOS power switch tube NMP1 is grounded, a drain terminal of the first NMOS power switch tube NMP1 is connected to a drain terminal of the first PMOS power switch tube PMP1, and is used as a first input end of the power switch tube rectification module 300 to input the first alternating current input voltage AC1, a gate terminal of the second NMOS power switch tube NMP2 is connected to a second output end of the gate driver module 200 and one end of the second pull-down resistor Rd2, the other end of the second pull-down resistor Rd2 is grounded, a source terminal of the second NMOS power switch tube NMP2 is grounded, a drain terminal of the second NMOS power switch tube NMP2 is connected to a drain terminal of the second PMOS power switch tube PMP2, and is used as a second input end of the power switch tube rectification module 300 to input the second alternating current input voltage AC2, a gate terminal of the first PMOS power switch tube PMP1 is connected to a third output end of the gate driver module 200 and one end of the first pull-up resistor Ru1, a gate terminal of the second PMOS power switch tube PMP2 is connected to a fourth output end of the gate driver module 200 and one end of the second pull-up resistor Ru2, and the other end of the first pull-up resistor Ru1 is connected to a source terminal of the first PMOS power switch tube PMP1, the other end of the second pull-up resistor Ru2, a source terminal of the second PMOS power switch tube PMP2, the bias module 100, and the gate driver module 200, and is used as an output end of the power switch tube rectification module 300 to output the direct current output voltage VCC.

As shown in FIG. 2, the gate terminal of the first NMOS power switch tube NMP1 is controlled by the gate drive signal GATE_N1 of the first NMOS power switch tube to be turned on or off. The gate terminal of the second NMOS power switch tube NMP2 is controlled by the gate drive signal GATE_N2 of the second NMOS power switch tube to be turned on or off. The gate terminal of the first PMOS power switch tube PMP1 is controlled by the gate drive signal GATE_P1 of the first PMOS power switch tube to be turned on or off. The gate terminal of the second PMOS power switch tube PMP2 is controlled by the gate drive signal GATE_P2 of the second PMOS power switch tube to be turned on or off.

In this example, the existing diodes are replaced with the four power switch tubes (the first NMOS power switch tube NMP1, the second NMOS power switch tube NMP2, the first PMOS power switch tube PMP1, and the second PMOS power switch tube PMP2) for the design of the rectifier bridge, thereby greatly reducing a power loss. Compared with the design of the rectifier bridge composed of four diodes, this example uses two NMOS power switch tubes and two PMOS power switch tube for the design of the rectifier bridge, so that a case that the voltage of the gate drive signal is greater than the alternating current input voltage does not occur, thereby reducing design complexity of the gate driver module, and simplifying circuit layout design (that is, simplifying the circuit layout design by avoiding the processing of gate drive signals, a voltage withstand problem of a chip substrate, and an isolation problem of surrounding devices). The active rectifier bridge circuit in this example not only reduces the power loss, but also reduces the design complexity, and simplifies the circuit layout design, and is applicable to an application scenario with a relatively small current. Preferably, the first NMOS power switch tube NMP1, the second NMOS power switch tube NMP2, the first PMOS power switch tube PMP1, and the second PMOS power switch tube PMP2 all use a gate source low voltage-withstand structure MOSFET, to implement smaller conduction internal resistance per unit area, thereby further reducing the power loss.

Figure 3:
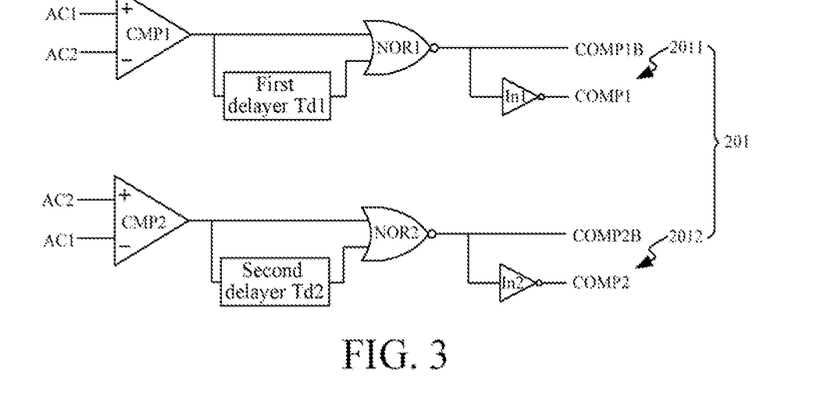
FIG. 3 is a specific circuit diagram of an alternating current level determining unit in the gate driver module consistent with the present invention.
Figure 4:
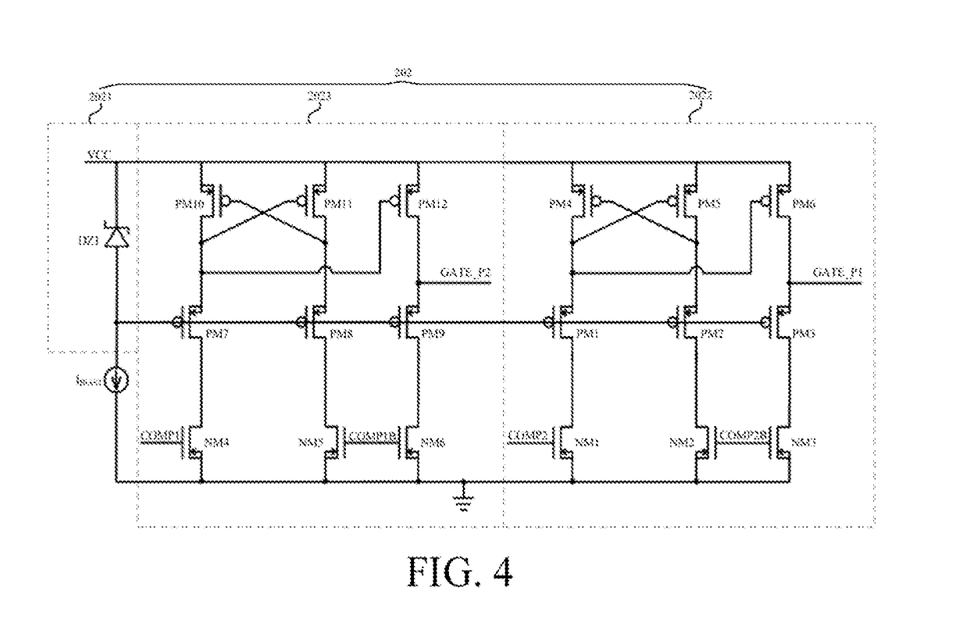
FIG. 4 is a specific circuit diagram of a gate drive unit of a PMOS power switch tube in the gate driver module consistent with the present invention.
Figure 5:
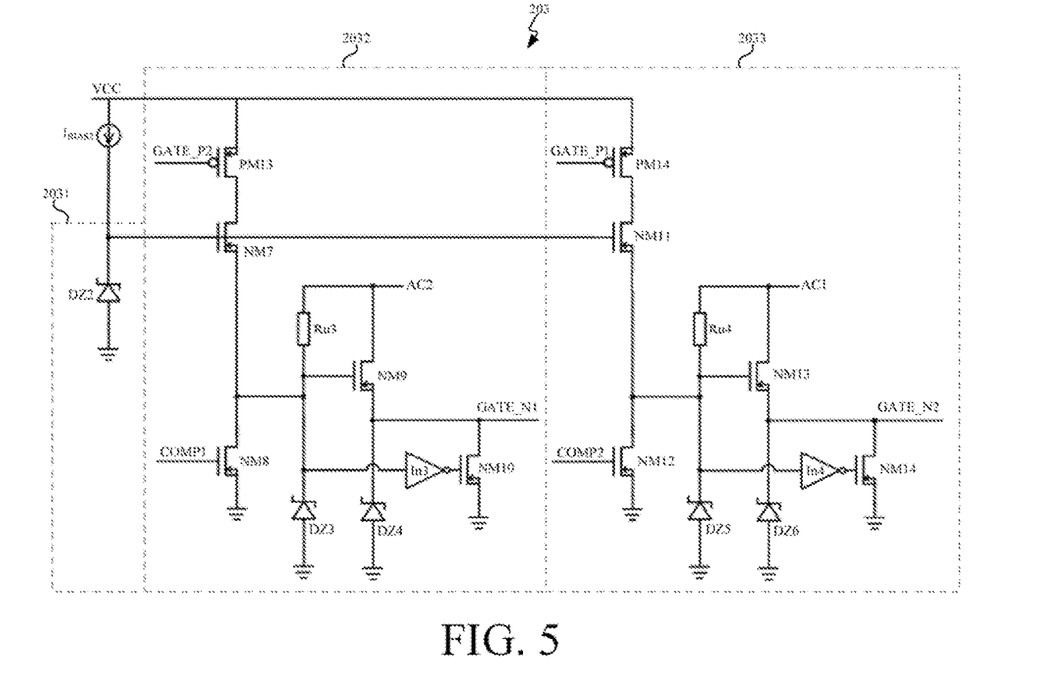
FIG. 5 is a specific circuit diagram of a gate drive unit of an NMOS power switch tube in the gate driver module consistent with the present invention.
Figure 6:
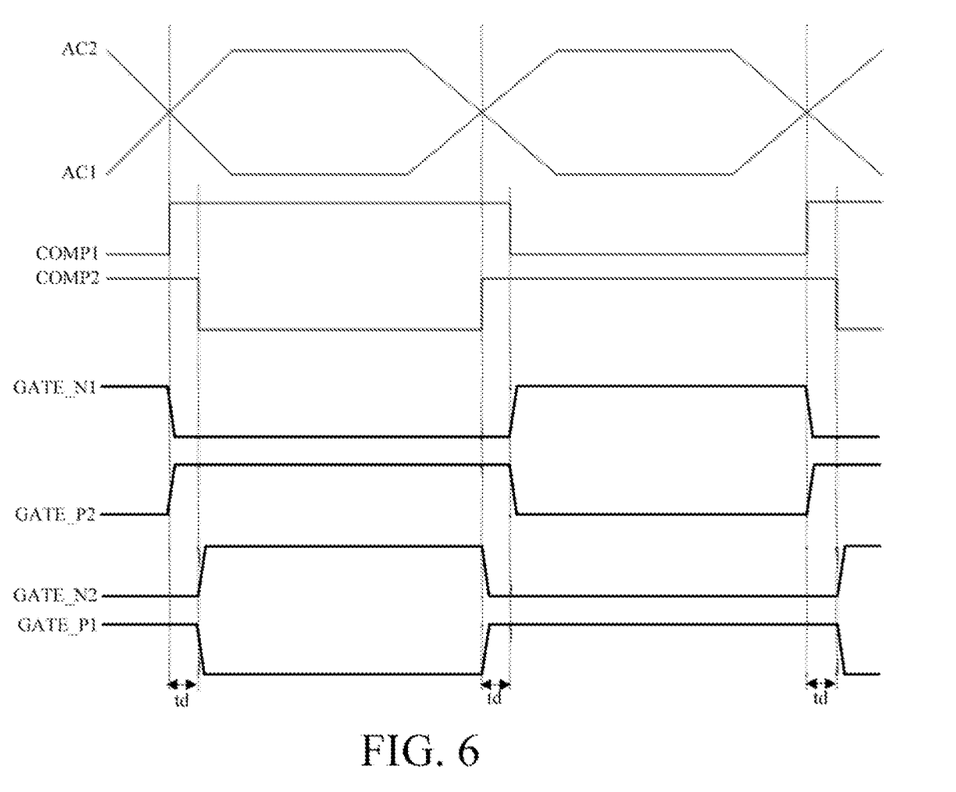
FIG. 6 is a time sequence diagram of one group of alternating current input voltages (AC1 and AC2), two control signals (COMP1 and COMP2), and four gate drive signals (GATE_N1 GATE_N2 GATE_P1, and GATE_P2) in the active rectifier bridge circuit consistent with the present invention.

For example, as shown in FIG. 3 to FIG. 5, the gate driver module 200 comprises: an alternating current level determining unit 201, a gate drive unit 202 of the PMOS power switch tube, and a gate drive unit 203 of the NMOS power switch tube.

The alternating current level determining unit 201 is controlled by the internal power supply VDD, and is configured to: compare the first alternating current input voltage AC1 with the second alternating current input voltage AC2 in the one group of alternating current input voltages, and perform logical operation processing on a comparison result and a delay of the comparison result, to generate the two groups of control signals COMP1B, COMP1, COMP2B, and COMP2 that are mutually inverted.

The gate drive unit 202 of the PMOS power switch tube is connected to the alternating current level determining unit 201 and the power switch tube rectification module 300, is controlled by the first bias current source $I_{BIAS1}$, and is configured to: generate the gate drive signals GATE_P1 and GATE_P2 of the two PMOS power switch tubes under the control of the two groups of control signals COMP1B, COMP1, COMP2B, and COMP2 that are mutually inverted.

The gate drive unit 203 of the NMOS power switch tube is connected to the alternating current level determining unit 201, the gate drive unit 202 of the PMOS power switch tube, and the power switch tube rectification module 300, is controlled by the second bias current source $I_{BIAS2}$, and is configured to: generate the gate drive signals GATE_N1 and GATE_N2 of the two NMOS power switch tubes under the control of the two groups of control signals COMP1B, COMP1, COMP2B, and COMP2 that are mutually inverted and the gate drive signals GATE_P1 and GATE_P2 of the two PMOS power switch tubes.

Specifically, as shown in FIG. 3, the alternating current level determining unit 201 comprises: a first alternating current level determining part 2011 and a second alternating current level determining part 2012.

The first alternating current level determining part 2011 comprises: a first comparator CMP1, a first delayer Td1, a first NOR gate NOR1, and a first phase inverter In1, wherein an in-phase input end of the first comparator CMP1 accesses the first alternating current input voltage AC1, an inverting input end of the first comparator CMP1 accesses the second alternating current input voltage AC2, an output end of the first comparator CMP1 is connected to an input end of the first delayer Td1 and a first input end of the first NOR gate NOR1, an output end of the first delayer Td1 is connected to a second input end of the first NOR gate NOR1, an output end of the first NOR gate NOR1 is connected to an input end of the first phase inverter In1, and is used as a first output end of the alternating current level determining unit 201 to output the first control signal COMP1B, and an output end of the first phase inverter In1 is used as a second output end of the alternating current level determining unit 201 to output the second control signal COMP1.

The second alternating current level determining part 2012 comprises: a second comparator CMP2, a second delayer Td2, a second NOR gate NOR2, and a second phase inverter In2, wherein an in-phase input end of the second comparator CMP2 accesses the second alternating current input voltage AC2, an inverting input end of the second comparator CMP2 accesses the first alternating current input voltage AC1, an output end of the second comparator CMP2 is connected to an input end of the second delayer Td2 and a first input end of the second NOR gate NOR2, an output end of the second delayer Td2 is connected to a second input end of the second NOR gate NOR2, an output end of the second NOR gate NOR2 is connected to an input end of the second phase inverter In2, and is used as a third output end of the alternating current level determining unit 201 to output the third control signal COMP2B, and an output end of the second phase inverter In2 is used as a fourth output end of the alternating current level determining unit 201 to output the fourth control signal COMP2.

A delay time of the first delayer Td1 is the same as a delay time of the second delayer Td2, and both are td. The first NOR gate NOR1, the second NOR gate NOR2, the first phase inverter In1, and the second phase inverter In2 are all controlled by the internal power supply VDD.

As shown in FIG. 3, when the first alternating current input voltage AC1 is higher than the second alternating current input voltage AC2, an output of the first comparator CMP1 is converted from a low level to a high level. In this case, the first NOR gate NOR1 outputs the low level. That is, the first control signal COMP1B is converted from the high level to the low level, and the second control signal COMP1 is converted from the low level to the high level. An output of the second comparator CMP2 is converted from the high level to the low level, and after the delay time td of the second delayer Td2, an output of the second NOR gate NOR2 is converted from the low level to the high level. That is, the third control signal COMP2B is converted from the low level to the high level, and the fourth control signal COMP2 is converted from the high level to the low level. When the first alternating current input voltage AC1 is lower than the second alternating current input voltage AC2, an output of the first comparator CMP1 is converted from a high level to a low level, and after the delay time td of the first delayer Td1, an output of the first NOR gate NOR1 is converted from the low level to the high level. That is, the first control signal COMP1B is converted from the low level to the high level, and the second control signal COMP1 is converted from the high level to the low level. An output of the second comparator CMP2 is converted from the low level to the high level. In this case, the second NOR gate NOR2 outputs the low level. That is, the third control signal COMP2B is converted from the high level to the low level, and the fourth control signal COMP2 is converted from the low level to the high level (for related signal time sequences, refer to FIG. 6).

Specifically, as shown in FIG. 4, the gate drive unit 202 of the PMOS power switch tube comprises: a PMOS voltage regulation part 2021, a gate drive part 2022 of the first PMOS power switch tube, and a gate drive part 2023 of the second PMOS power switch tube.

The PMOS voltage regulation part 2021 is configured to provide a first clamping voltage $V_{DZ1}$ for the gate drive part 2022 of the first PMOS power switch tube and the gate drive part 2023 of the second PMOS power switch tube.

The gate drive part 2022 of the first PMOS power switch tube is connected to the PMOS voltage regulation part 2021, the alternating current level determining unit 201, and the power switch tube rectification module 300, is controlled by the first bias current source $I_{BIAS1}$, and is configured to: generate, based on the accessed direct current output voltage VCC, a gate drive signal GATE_P1 that turns off the first PMOS power switch tube, or generate, based on the accessed first clamping voltage $V_{DZ1}$, a gate drive signal GATE_P1 that turns on the first PMOS power switch tube, under the control of one group of control signals COMP2B and COMP2 that are mutually inverted and that are outputted by a third output end and a fourth output end of the alternating current level determining unit 201.

The gate drive part 2023 of the second PMOS power switch tube is connected to the PMOS voltage regulation part 2021, the alternating current level determining unit 201, and the power switch tube rectification module 300, is controlled by the first bias current source $I_{BIAS1}$, and is configured to: generate, based on the accessed direct current output voltage VCC, a gate drive signal GATE_P2 that turns off the second PMOS power switch tube, or generate, based on the accessed first clamping voltage $V_{DZ1}$, a gate drive signal GATE_P2 that turns on the second PMOS power switch tube, under the control of one group of control signals COMP1B and COMP1 that are mutually inverted and that are outputted by a first output end and a second output end of the alternating current level determining unit 201.

As shown in FIG. 4, the PMOS voltage regulation part 2021 comprises a first voltage regulator tube DZ1, wherein a cathode terminal of the first voltage regulator tube DZ1 accesses the direct current output voltage VCC, and an anode terminal of the first voltage regulator tube DZ1 is used as an output end of the PMOS voltage regulation part 2021 to output the first clamping voltage $V_{DZ1}$.

As shown in FIG. 4, the gate drive part 2022 of the first PMOS power switch tube comprises: a first NMOS tube NM1, a second NMOS tube NM2, a third NMOS tube NM3, a first PMOS tube PM1, a second PMOS tube PM2, a third PMOS tube PM3, a fourth PMOS tube PM4, a fifth PMOS tube PM5, and a sixth PMOS tube PM6, wherein a source terminal of the first NMOS tube NM1, a source terminal of the second NMOS tube NM2, and a source terminal of the third NMOS tube NM3 are all grounded, a gate terminal of the first NMOS tube NM1 is connected to the fourth output end of the alternating current level determining unit 201 to access the fourth control signal COMP2, a drain terminal of the first NMOS tube NM1 is connected to a drain terminal of the first PMOS tube PM1, a gate terminal of the second NMOS tube NM2 is connected to a gate terminal of the third NMOS tube NM3, and is simultaneously connected to the third output end of the alternating current level determining unit 201 to access the third control signal COMP2B, a drain terminal of the second NMOS tube NM2 is connected to a drain terminal of the second PMOS tube PM2, a drain terminal of the third NMOS tube NM3 is connected to a drain terminal of the third PMOS tube PM3, a gate terminal of the first PMOS tube PM1, a gate terminal of the second PMOS tube PM2, and a gate terminal of the third PMOS tube PM3 are all connected to an output end of the PMOS voltage regulation part 2021, and are controlled by the first bias current source $I_{BIAS1}$, a source terminal of the first PMOS tube PM1 is connected to a drain terminal of the fourth PMOS tube PM4, a source terminal of the second PMOS tube PM2 is connected to a drain terminal of the fifth PMOS tube PM5, a source terminal of the third PMOS tube PM3 is connected to a drain terminal of the sixth PMOS tube PM6, and is used as an output end of the gate drive part 2022 of the first PMOS power switch tube to output the gate drive signal GATE_P1 of the first PMOS power switch tube, a source terminal of the fourth PMOS tube PM4, a source terminal of the fifth PMOS tube PM5, and a source terminal of the sixth PMOS tube PM6 all access the direct current output voltage VCC, a gate terminal of the fourth PMOS tube PM4 is connected to the drain terminal of the fifth PMOS tube PM5, a gate terminal of the fifth PMOS tube PM5 is connected to the drain terminal of the fourth PMOS tube PM4, and a gate terminal of the sixth PMOS tube PM6 is connected to the source terminal of the first PMOS tube PM1. In this example, the first PMOS tube PM1 and the second PMOS tube PM2 are high-voltage isolation tubes.

As shown in FIG. 4, the gate drive part 2023 of the second PMOS power switch tube comprises: a fourth NMOS tube NM4, a fifth NMOS tube NM5, a sixth NMOS tube NM6, a seventh PMOS tube PM7, an eighth PMOS tube PM8, a ninth PMOS tube PM9, a tenth PMOS tube PM10, an eleventh PMOS tube PM11, and a twelfth PMOS tube PM12, wherein a source terminal of the fourth NMOS tube NM4, a source terminal of the fifth NMOS tube NM5, and a source terminal of the sixth NMOS tube NM6 are all grounded, a gate terminal of the fourth NMOS tube NM4 is connected to the second output end of the alternating current level determining unit 201 to access the second control signal COMP1, a drain terminal of the fourth NMOS tube NM4 is connected to a drain terminal of the seventh PMOS tube PM7, a gate terminal of the fifth NMOS tube NM5 is connected to a gate terminal of the sixth NMOS tube NM6, and is simultaneously connected to the first output end of the alternating current level determining unit 201 to access the first control signal COMP1B, a drain terminal of the fifth NMOS tube NM5 is connected to a drain terminal of the eighth PMOS tube PM8, a drain terminal of the sixth NMOS tube NM6 is connected to a drain terminal of the ninth PMOS tube PM9, a gate terminal of the seventh PMOS tube PM7, a gate terminal of the eighth PMOS tube PM8, and a gate terminal of the ninth PMOS tube PM9 are all connected to an output end of the PMOS voltage regulation part 2021, and are controlled by the first bias current source $I_{BIAS1}$, a source terminal of the seventh PMOS tube PM7 is connected to a drain terminal of the tenth PMOS tube PM10, a source terminal of the eighth PMOS tube PM8 is connected to a drain terminal of the eleventh PMOS tube PM11, a source terminal of the ninth PMOS tube PM9 is connected to a drain terminal of the twelfth PMOS tube PM12, and is used as an output end of the gate drive part of the second PMOS power switch tube 2023 to output the gate drive signal GATE_P2 of the second PMOS power switch tube, a source terminal of the tenth PMOS tube PM10, a source terminal of the eleventh PMOS tube PM11, and a source terminal of the twelfth PMOS tube PM12 all access the direct current output voltage VCC, a gate terminal of the tenth PMOS tube PM10 is connected to the drain terminal of the eleventh PMOS tube PM11, a gate terminal of the eleventh PMOS tube PM11 is connected to the drain terminal of the tenth PMOS tube PM10, and a gate terminal of the twelfth PMOS tube PM12 is connected to the source terminal of the seventh PMOS tube PM7. In this example, the seventh PMOS tube PM7 and the eighth PMOS tube PM8 are high-voltage isolation tubes.

As shown in FIG. 4, when the third control signal COMP2B is at the low level, and the fourth control signal COMP2 is at the high level, the first NMOS tube NM1 is turned on, the second NMOS tube NM2 and the third NMOS tube NM3 are turned off, and the first PMOS tube PM1, the second PMOS tube PM2, and the third PMOS tube PM3 are controlled by the first bias current source $I_{BIAS1}$ to be turned on. In this case, a gate terminal voltage of the sixth PMOS tube PM6 is pulled to the low level by the first PMOS tube PM1 to be turned on. In this case, a voltage of the gate drive signal GATE_P1 of the first PMOS power switch tube is pulled up to VCC by the sixth PMOS tube PM6, to quickly turn off the first PMOS power switch tube PMP1. When the third control signal COMP2B is at the high level, and the fourth control signal COMP2 is at the low level, the first NMOS tube NM1 is turned off, the second NMOS tube NM2 and the third NMOS tube NM3 are turned on, and the first PMOS tube PM1, the second PMOS tube PM2, the third PMOS tube PM3 are controlled by the first bias current source $I_{BIAS1}$ to be turned on. In this case, the fourth PMOS tube PM4 and the fifth PMOS tube PM5 are turned on, and the gate terminal voltage of the sixth PMOS tube PM6 is pulled up to VCC by the fourth PMOS tube PM4 to be turned off. In this case, the voltage of the gate drive signal GATE_P1 of the first PMOS power switch tube is pulled down to (VCC−$V_{DZ1}$+$V_{TH3}$) by the third PMOS tube PM3, to quickly turn on the first PMOS power switch tube PMP1, and $V_{TH3}$ is a threshold voltage of the third PMOS tube PM3. When the first control signal COMP1B is at the low level, and the second control signal COMP1 is at the high level, the fourth NMOS tube NM4 is turned on, the fifth NMOS tube NM5 and the sixth NMOS tube NM6 are turned off, and the seventh PMOS tube PM7, the eighth PMOS tube PM8, and the ninth PMOS tube PM9 are controlled by the first bias current source $I_{BIAS1}$ to be turned on. In this case, a gate terminal voltage of the twelfth PMOS tube PM12 is pulled to the low level by the seventh PMOS tube PM7 to be turned on. In this case, a voltage of the gate drive signal GATE_P2 of the second PMOS power switch tube is pulled up to VCC by the twelfth PMOS tube PM12, to quickly turn off the second PMOS power switch tube PMP2. When the first control signal COMP1B is at the high level, and the second control signal COMP1 is at the low level, the fourth NMOS tube NM4 is turned off, the fifth NMOS tube NM5 and the sixth NMOS tube NM6 are turned on, and the seventh PMOS tube PM7, the eighth PMOS tube PM8, and the ninth PMOS tube PM9 are controlled by the first bias current source $I_{BIAS1}$ to be turned on. In this case, the tenth PMOS tube PM10 and the eleventh PMOS tube PM11 are turned on, and the gate terminal voltage of the twelfth PMOS tube PM12 is pulled up to VCC by the tenth PMOS tube PM10 to be turned off. In this case, the voltage of the gate drive signal GATE_P2 of the second PMOS power switch tube is pulled down to (VCC−$V_{DZ1}$+$V_{TH9}$) by the ninth PMOS tube PM9, to quickly turn on the second PMOS power switch tube PMP2, and $V_{TH9}$ is a threshold voltage of the ninth PMOS tube PM9 (for related signal time sequences, refer to FIG. 6).

Specifically, as shown in FIG. 5, the gate drive unit 203 of the NMOS power switch tube comprises: an NMOS voltage regulation part 2031, a gate drive part 2032 of the first NMOS power switch tube, and a gate drive part 2033 of the second NMOS power switch tube.

The NMOS voltage regulation part 2031 is configured to provide a second clamping voltage $V_{DZ2}$ for the gate drive part 2032 of the first NMOS power switch tube and the gate drive part 2033 of the second NMOS power switch tube.

The gate drive part 2032 of the first NMOS power switch tube is connected to the NMOS voltage regulation part 2031, the alternating current level determining unit 201, the gate drive unit 202 of the PMOS power switch tube, and the power switch tube rectification module 300, is controlled by the second bias current source $I_{BIAS2}$, and is configured to: generate, based on the accessed second clamping voltage $V_{DZ2}$, a gate drive signal GATE_N1 that turns off or on the first NMOS power switch tube, under the control of a control signal COMP1 outputted by a second output end of the alternating current level determining unit 201 and a gate drive signal GATE_P2 of the second PMOS power switch tube outputted by the gate drive unit 202 of the PMOS power switch tube.

The gate drive part 2033 of the second NMOS power switch tube is connected to the NMOS voltage regulation part 2031, the alternating current level determining unit 201, the gate drive unit 202 of the PMOS power switch tube, and the power switch tube rectification module 300, is controlled by the second bias current source $I_{BIAS2}$, and is configured to: generate, based on the accessed second clamping voltage $V_{DZ2}$, a gate drive signal GATE_N2 that turns off or on the second NMOS power switch tube, under the control of a control signal COMP2 outputted by a fourth output end of the alternating current level determining unit 201 and a gate drive signal GATE_P1 of the first PMOS power switch tube outputted by the gate drive unit 202 of the PMOS power switch tube.

As shown in FIG. 5, the NMOS voltage regulation part 2031 comprises: a second voltage regulator tube DZ2, wherein an anode terminal of the second voltage regulator tube DZ2 is grounded, and a cathode terminal of the second voltage regulator tube DZ2 is used as an output end of the NMOS voltage regulation part 2031 to output the second clamping voltage $V_{DZ2}$.

As shown in FIG. 5, the gate drive part 2032 of the first NMOS power switch tube comprises: a thirteenth PMOS tube PM13, a seventh NMOS tube NM7, an eighth NMOS tube NMB, a ninth NMOS tube NM9, a tenth NMOS tube NM10, a third pull-up resistor Ru3, a third voltage regulator tube DZ3, a fourth voltage regulator tube DZ4, and a third phase inverter In3, wherein a gate terminal of the thirteenth PMOS tube PM13 accesses the gate drive signal GATE_P2 of the second PMOS power switch tube outputted by the gate drive unit 202 of the PMOS power switch tube, a source terminal of the thirteenth PMOS tube PM13 accesses the direct current output voltage VCC, a drain terminal of the thirteenth PMOS tube PM13 is connected to a drain terminal of the seventh NMOS tube NM7, a gate terminal of the seventh NMOS tube NM7 is connected to an output end of the NMOS voltage regulation part 2031, and is controlled by the second bias current source $I_{BIAS2}$, a source terminal of the seventh NMOS tube NM7 is connected to a drain terminal of the eighth NMOS tube NM8, a cathode terminal of the third voltage regulator tube DZ3, an input end of the third phase inverter In3, a gate terminal of the ninth NMOS tube NM9, and one end of the third pull-up resistor Ru3, a gate terminal of the eighth NMOS tube NM8 is connected to a second output end of the alternating current level determining unit 201 to access the second control signal COMP1, a source terminal of the eighth NMOS tube NM8 is grounded, an anode terminal of the third voltage regulator tube DZ3 is grounded, an output end of the third phase inverter In3 is connected to a gate terminal of the tenth NMOS tube NM10, a drain terminal of the ninth NMOS tube NM9 is connected to the other end of the third pull-up resistor Ru3, and simultaneously accesses the second alternating current input voltage AC2, a source terminal of the ninth NMOS tube NM9 is connected to a cathode terminal of the fourth voltage regulator tube DZ4 and a drain terminal of the tenth NMOS tube NM10, and is used as an output end of the gate drive part 2032 of the first NMOS power switch tube to output the gate drive signal GATE_N1 of the first NMOS power switch tube, and a source terminal of the tenth NMOS tube NM10 is grounded.

As shown in FIG. 5, the gate drive part 2033 of the second NMOS power switch tube comprises: a fourteenth PMOS tube PM14, an eleventh NMOS tube NM11, a twelfth NMOS tube NM12, a thirteenth NMOS tube NM13, a fourteenth NMOS tube NM14, a fourth pull-up resistor Ru4, a fifth voltage regulator tube DZ5, a sixth voltage regulator tube DZ6, and a fourth phase inverter In4, wherein a gate terminal of the fourteenth PMOS tube PM14 accesses the gate drive signal GATE_P1 of the first PMOS power switch tube outputted by the gate drive unit 202 of the PMOS power switch tube, a source terminal of the fourteenth PMOS tube PM14 accesses the direct current output voltage VCC, a drain terminal of the fourteenth PMOS tube PM14 is connected to a drain terminal of the eleventh NMOS tube NM11, a gate terminal of the eleventh NMOS tube NM11 is connected to an output end of the NMOS voltage regulation part 2031, and is controlled by the second bias current source $I_{BIAS2}$, a source terminal of the eleventh NMOS tube NM11 is connected to a drain terminal of the twelfth NMOS tube NM12, a cathode terminal of the fifth voltage regulator tube DZ5, an input end of the fourth phase inverter In4, a gate terminal of the thirteenth NMOS tube NM13, and one end of the fourth pull-up resistor Ru4, a gate terminal of the twelfth NMOS tube NM12 is connected to a fourth output end of the alternating current level determining unit 201 to access the fourth control signal COMP2, a source terminal of the twelfth NMOS tube NM12 is grounded, an anode terminal of the fifth voltage regulator tube DZ5 is grounded, an output end of the fourth phase inverter In4 is connected to a gate terminal of the fourteenth NMOS tube NM14, a drain terminal of the thirteenth NMOS tube NM13 is connected to the other end of the fourth pull-up resistor Ru4, and simultaneously accesses the first alternating current input voltage AC1, a source terminal of the thirteenth NMOS tube NM13 is connected to a cathode terminal of the sixth voltage regulator tube DZ6 and a drain terminal of the fourteenth NMOS tube NM14, and is used as an output end of the gate drive part 2033 of the second NMOS power switch tube to output the gate drive signal GATE_N2 of the second NMOS power switch tube, and a source terminal of the fourteenth NMOS tube NM14 is grounded.

As shown in FIG. 5, when the first alternating current input voltage AC1 is higher than the second alternating current input voltage AC2, the first control signal COMP1B outputted by the alternating current level determining unit 201 is converted from the high level to the low level, the second control signal COMP1 outputted by the alternating current level determining unit 201 is converted from the low level to the high level. In this case, a voltage of the gate drive signal GATE_P2 of the second PMOS power switch tube is pulled up to VCC by the twelfth PMOS transistor PM12 to control the second PMOS power switch tube PMP2 to be turned off, and the gate driving signal GATE_P2 of the second PMOS power switch tube controls the thirteenth PMOS transistor PM13 to be turned off. The second control signal COMP1 controls the eighth NMOS tube NM8 to be turned on, to pull a gate terminal voltage of the ninth NMOS tube NM9 to the low level for turn-off, and pull a gate terminal voltage of the tenth NMOS tube NM10 to the high level for turn-on by using the eighth NMOS tube NMB, so that gate terminal charge of the first NMOS power switch tube NMP1 is quickly discharged by using the tenth NMOS tube NM10 to turn off the first NMOS power switch tube NMP1. After the delay time td, the third control signal COMP2B outputted by the alternating current level determining unit 201 is converted from the low level to the high level, and the fourth control signal COMP2 outputted by the alternating current level determining unit 201 is converted from the high level to the low level. In this case, a voltage of the gate drive signal GATE_P1 of the first PMOS power switch tube is pulled down to $(VCC-V_{DZ1}+V_{TH3})$ by the third PMOS tube PM3 to control the first PMOS power switch tube PMP1 to be turned on, the gate drive signal GATE_P1 of the first PMOS power switch tube controls the fourteenth PMOS tube PM14 to be turned on, the fourth control signal COMP2 controls the twelfth NMOS tube NM12 to be turned off, and the eleventh NMOS tube NM11 is controlled by the second bias current source $I_{BIAS2}$ to be turned on, so that a gate terminal voltage of the thirteenth NMOS tube NM13 is finally pulled up to a clamping voltage $V_{DZ5}$ of the fifth voltage regulator tube by the fifth voltage regulator tube DZ5 for turn-on, a gate terminal voltage of the fourteenth NMOS tube NM14 is pulled to the low level for turn-off, and further, a voltage of the gate drive signal GATE_N2 of the second NMOS power switch tube is clamped at ($V_{DZ6}$-$V_{TH12}$) to turn on the second NMOS power switch tube NMP2. $V_{DZ6}$ is a clamping voltage of the sixth voltage regulator tube DZ6, and $V_{TH12}$ is a threshold voltage of the twelfth NMOS tube NM12. When the first alternating current input voltage AC1 is lower than the second alternating current input voltage AC2, the third control signal COMP2B outputted by the alternating current level determining unit 201 is converted from the high level to the low level, and the fourth control signal COMP2 is converted from the low level to the high level. In this case, the voltage of the gate drive signal GATE_P1 of the first PMOS power switch tube is pulled up to VCC by the sixth PMOS tube PM6 to control the first PMOS power switch tube to be turned off, the gate drive signal GATE_P1 of the first PMOS power switch tube controls the fourteenth PMOS tube PM14 to be turned off, and the fourth control signal COMP2 controls the twelfth NMOS tube NM12 to be turned on, to pull a gate terminal voltage of the thirteenth NMOS tube NM13 to the low level for turn-off, and pull a gate terminal voltage of the fourteenth NMOS tube NM14 to the high level for turn-on by using the twelfth NMOS tube NM12, so that gate terminal charge of the second NMOS power switch tube NMP2 is quickly discharged by using the fourteenth NMOS tube NM14 to turn off the second NMOS power switch tube NMP2. After the delay time td, the first control signal COMP1B outputted by the alternating current level determining unit 201 is converted from the low level to the high level, and the second control signal COMP1 outputted by the alternating current level determining unit 201 is converted from the high level to the low level. In this case, a voltage of the gate drive signal GATE_P2 of the second PMOS power switch tube is pulled down to (VCC−$V_{DZ1}$+$V_{TH9}$) by the ninth PMOS tube PM9 to control the second PMOS power switch tube PMP2 to be turned on, the gate drive signal GATE_P2 of the second PMOS power switch tube controls the thirteenth PMOS tube PM13 to be turned on, the second control signal COMP1 controls the eighth NMOS tube NM8 to be turned off, and the seventh NMOS tube NM7 is controlled by the second bias current source $I_{BIAS2}$ to be turned on, so that the gate terminal voltage of the ninth NMOS tube NM9 is finally pulled up to a clamping voltage $V_{DZ3}$ of the third voltage regulator tube by the third voltage regulator tube DZ3 for turn-on, the gate terminal voltage of the tenth NMOS tube NM10 is pulled to the low level for turn-off, and further, the voltage of the gate drive signal GATE_N1 of the first NMOS power switch tube is clamped at ($V_{DZ4}$-$V_{TH9}$) to turn on the first NMOS power switch tube NMP1. $V_{DZ4}$ is a clamping voltage of the fourth voltage regulator tube DZ4, and $V_{TH9}$ is a threshold voltage of the ninth NMOS tube NM9 (for related signal time sequences, refer to FIG. 6).

In this example, the alternating current level determining unit 201 generates, by using the first delayer Td1 and the second delayer Td2, two groups of control signals that are mutually inverted and that have the delay time td, and the gate drive unit 202 of the PMOS power switch tube and the gate drive unit 203 of the NMOS power switch tube generate the gate drive signals of the four power switch tubes based on the two groups of control signals, thereby implementing dead-time control on turn-on/off of the four power switch tubes. Specifically, when the first alternating current input voltage AC1 is higher than the second alternating current input voltage AC2, the second NMOS power switch tube NMP2 and the first PMOS power switch tube PMP1 are turned on, and the first NMOS power switch tube NMP1 and the second PMOS power switch tube PMP2 are turned off. When the first alternating current input voltage AC1 is lower than the second alternating current input voltage AC2, the first NMOS power switch tube NMP2 and the second PMOS power switch tube PMP1 are turned on, and the second NMOS power switch tube NMP1 and the first PMOS power switch tube PMP2 are turned off, so that the active rectifier bridge circuit in this example implements a safe and reliable rectification function, and rectification efficiency of the active rectifier bridge circuit is significantly improved.

Embodiment 2

Figure 7:
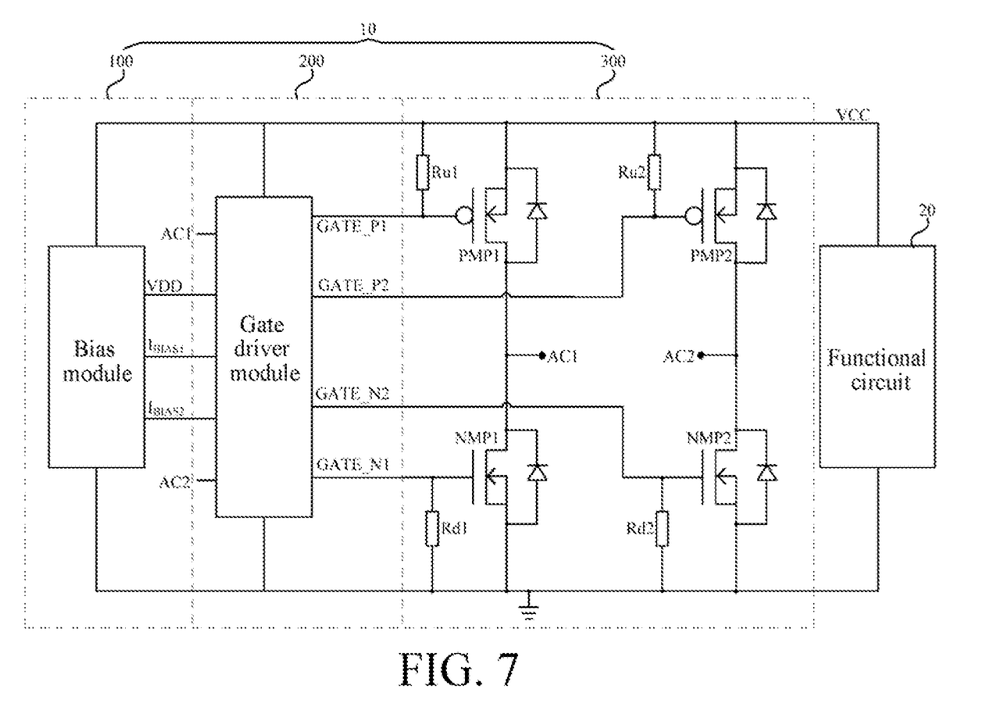
FIG. 7 is a circuit diagram of the on-chip integrated system consistent with the present invention.

As shown in FIG. 7, this embodiment provides an on-chip integrated system, comprising: the active rectifier bridge circuit 10 according to Embodiment 1 and a functional circuit 20 connected to an output end of the active rectifier bridge circuit 10, wherein the active rectifier bridge circuit 10 provides a working voltage VCC for the functional circuit 20, and the active rectifier bridge circuit 10 and the functional circuit 20 are formed on the same silicon wafer.

In this example, because the active rectifier bridge circuit 10 and the functional circuit 20 are formed on the same silicon wafer, to reduce circuit production costs, the MOS tubes (comprising PMOS tubes and NMOS tubes) in the gate drive unit of the PMOS power switch tube and the MOS tubes (comprising PMOS tubes and NMOS tubes) in the gate drive unit of the NMOS power switch tube of the active rectifier bridge circuit 10 all use a gate source low voltage-withstand structure MOSFET. It should be noted that, the active rectifier bridge circuit in this example is the same as that in Embodiment 1, and details are not described herein again.

For example, the functional circuit 20 is any existing circuit that can be connected to the output end of the active rectifier bridge circuit 10, and a specific circuit structure of the functional circuit is not limited in this example.

As described above, according to the active rectifier bridge circuit and the on-chip integrated system consistent with the present invention, the existing diodes are replaced with the four power switch tubes for the design of the rectifier bridge, thereby greatly reducing a power loss. In addition, in the present invention, the gate driver module controls the switch drive and time sequence of the four power switch tubes, to implement dead-time control on turn-on/off of the four power switch tubes, so that the active rectifier bridge circuit consistent with the present invention implements a safe and reliable rectification function, and rectification efficiency of the active rectifier bridge circuit is significantly improved. The active rectifier bridge circuit consistent with the present invention is implemented by using conventional process devices. Therefore, the active rectifier bridge circuit can be produced on the same silicon wafer as the functional circuit, thereby improving the product integration degree, and helping implement product miniaturization and intelligence. Therefore, the present invention effectively overcomes various defects in the prior art, and has a high value in industrial use.

The foregoing embodiments merely exemplify the principles and effects of the present invention, but are not intended to limit the present invention. Any person skilled in the art may make modifications or changes on the foregoing embodiments without departing from the spirit and scope of the present invention. Therefore, all equivalent modifications or changes made by a person of ordinary skill in the art without departing from the spirit and technical idea of the present invention shall be covered by the claims of the present invention.

What is claimed is:

1. An active rectifier bridge circuit, comprising:
a bias module, a gate driver module, and a power switch tube rectification module, wherein
the bias module is configured to provide a first bias current source, a second bias current source, and an internal power supply for the gate driver module;
the gate driver module is connected to the bias module, is controlled by the first bias current source, the second bias current source, and the internal power supply, and is configured to: process one group of alternating current input voltages to generate two groups of control signals that are mutually inverted, and generate four gate drive signals based on the two groups of control signals that are mutually inverted; and
the power switch tube rectification module is connected to the bias module and the gate driver module, comprises two NMOS power switch tubes and two PMOS power switch tubes, and is configured to: perform a turn-on or turn-off operation on the corresponding power switch tubes under the control of the four gate drive signals, and convert the one group of alternating current input voltages into a direct current output voltage for an output;
the gate driver module comprises an alternating current level determining unit, a gate drive unit of the PMOS power switch tube, and a gate drive unit of the NMOS power switch tube, wherein
the alternating current level determining unit is controlled by the internal power supply, and is configured to: compare a first alternating current input voltage with a second alternating current input voltage in the one group of alternating current input voltages, and perform logical operation processing on a comparison result and a delay of the comparison result, to generate the two groups of control signals that are mutually inverted;
the gate drive unit of each of the PMOS power switch tubes is connected to the alternating current level determining unit and the power switch tube rectification module, is controlled by the first bias current source, and is configured to: generate the gate drive signals of the two PMOS power switch tubes under the control of the two groups of control signals that are mutually inverted; and
the gate drive unit of the NMOS power switch tube; which is connected to the alternating current level determining unit, the gate drive unit of the PMOS power switch tube, the power switch tube rectification module; and which is controlled by the second bias current source; and which is configured to generate the gate drive signals of the two NMOS power switch tubes under the control of the two groups of control signals that are mutually inverted and the gate drive signals of the two PMOS power switch tubes;
the gate drive unit of the PMOS power switch tube comprises: a PMOS voltage regulation part, a gate drive part of a first PMOS power switch tube, and a gate drive part of a second PMOS power switch tube, wherein the PMOS voltage regulation part is configured to provide a first clamping voltage for the gate drive part of the first PMOS power switch tube and the gate drive part of the second PMOS power switch tube;
the gate drive part of the first PMOS power switch tube is connected to the PMOS voltage regulation part, the alternating current level determining unit, and the power switch tube rectification module, is controlled by the first bias current source, and is configured to: generate, based on the accessed direct current output voltage, the gate drive signal that turns off the first PMOS power switch tube, or generate, based on the accessed first clamping voltage, the gate drive signal that turns on the first PMOS power switch tube, under the control of the one group of control signals that are mutually inverted and that are outputted by a third output end and a fourth output end of the alternating current level determining unit; and
the gate drive part of the second PMOS power switch tube is connected to the PMOS voltage regulation part, the alternating current level determining unit, and the power switch tube rectification module, is controlled by the first bias current source, and is configured to: generate, based on the accessed direct current output voltage, the gate drive signal that turns off the second PMOS power switch tube, or generate, based on the accessed first clamping voltage, the gate drive signal that turns on the second PMOS power switch tube, under the control of the one group of control signals that are mutually inverted and that are outputted by a first output end and a second output end of the alternating current level determining unit.

2. The active rectifier bridge circuit as in claim 1, wherein the power switch tube rectification module comprises: a first NMOS power switch tube, a second NMOS power switch tube, the first PMOS power switch tube, the second PMOS power switch tube, a first pull-down resistor, a second pull-down resistor, a first pull-up resistor, and a second pull-up resistor, wherein a gate terminal of the first NMOS power switch tube is connected to a first output end of the gate driver module and one end of the first pull-down resistor, the other end of the first pull-down resistor is grounded, a source terminal of the first NMOS power switch tube is grounded, a drain terminal of the first NMOS power switch tube is connected to a drain terminal of the first PMOS power switch tube, and is used as a first input end of the power switch tube rectification module, a gate terminal of the second NMOS power switch tube is connected to a second output end of the gate driver module and one end of the second pull-down resistor, the other end of the second pull-down resistor is grounded, a source terminal of the second NMOS power switch tube is grounded, a drain terminal of the second NMOS power switch tube is connected to a drain terminal of the second PMOS power switch tube, and is used as a second input end of the power switch tube rectification module, a gate terminal of the first PMOS power switch tube is connected to a third output end of the gate driver module and one end of the first pull-up resistor, a gate terminal of the second PMOS power switch tube is connected to a fourth output end of the gate driver module and one end of the second pull-up resistor, and the other end of the first pull-up resistor is connected to a source terminal of the first PMOS power switch tube, the other end of the second pull-up resistor, a source terminal of the second PMOS power switch tube, the bias module, and the gate driver module, and is used as an output end of the power switch tube rectification module.

3. The active rectifier bridge circuit as in claim 1, wherein the alternating current level determining unit comprises: a first alternating current level determining part and a second alternating current level determining part, wherein the first alternating current level determining part comprises: a first comparator, a first delayer, a first NOR gate, and a first phase inverter, wherein an in-phase input end of the first comparator accesses the first alternating current input voltage, an inverting input end of the first comparator accesses the second alternating current input voltage, an output end of the first comparator is connected to an input end of the first delayer and a first input end of the first NOR gate, an output end of the first delayer is connected to a second input end of the first NOR gate, an output end of the first NOR gate is connected to an input end of the first phase inverter, and is used as the first output end of the alternating current level determining unit, and an output end of the first phase inverter is used as the second output end of the alternating current level determining unit; and the second alternating current level determining part comprises: a second comparator, a second delayer, a second NOR gate, and a second phase inverter, wherein an in-phase input end of the second comparator accesses the second alternating current input voltage, an inverting input end of the second comparator accesses the first alternating current input voltage, an output end of the second comparator is connected to an input end of the second delayer and a first input end of the second NOR gate, an output end of the second delayer is connected to a second input end of the second NOR gate, an output end of the second NOR gate is connected to an input end of the second phase inverter, and is used as the third output end of the alternating current level determining unit, and an output end of the second phase inverter is used as the fourth output end of the alternating current level determining unit, wherein a delay time of the first delayer is the same as a delay time of the second delayer, and the first NOR gate, the second NOR gate, the first phase inverter, and the second phase inverter are all controlled by the internal power supply.

4. The active rectifier bridge circuit as in claim 1, wherein the PMOS voltage regulation part comprises: a first voltage regulator tube, wherein a cathode terminal of the first voltage regulator tube accesses the direct current output voltage, and an anode terminal of the first voltage regulator tube is used as an output end of the PMOS voltage regulation part.

5. The active rectifier bridge circuit as in claim 1, wherein the gate drive part of the first PMOS power switch tube comprises: a first NMOS tube, a second NMOS tube, a third NMOS tube, a first PMOS tube, a second PMOS tube, a third PMOS tube, a fourth PMOS tube, a fifth PMOS tube, and a sixth PMOS tube, wherein a source terminal of the first NMOS tube, a source terminal of the second NMOS tube, and a source terminal of the third NMOS tube are all grounded, a gate terminal of the first NMOS tube is connected to the fourth output end of the alternating current level determining unit, a drain terminal of the first NMOS tube is connected to a drain terminal of the first PMOS tube, a gate terminal of the second NMOS tube is connected to a gate terminal of the third NMOS tube, and is simultaneously connected to the third output end of the alternating current level determining unit, a drain terminal of the second NMOS tube is connected to a drain terminal of the second PMOS tube, a drain terminal of the third NMOS tube is connected to a drain terminal of the third PMOS tube, a gate terminal of the first PMOS tube, a gate terminal of the second PMOS tube, and a gate terminal of the third PMOS tube are all connected to an output end of the PMOS voltage regulation part, and are controlled by the first bias current source, a source terminal of the first PMOS tube is connected to a drain terminal of the fourth PMOS tube, a source terminal of the second PMOS tube is connected to a drain terminal of the fifth PMOS tube, a source terminal of the third PMOS tube is connected to a drain terminal of the sixth PMOS tube, and is used as an output end of the gate drive part of the first PMOS power switch tube, a source terminal of the fourth PMOS tube, a source terminal of the fifth PMOS tube, and a source terminal of the sixth PMOS tube all access the direct current output voltage, a gate terminal of the fourth PMOS tube is connected to the drain terminal of the fifth PMOS tube, a gate terminal of the fifth PMOS tube is connected to the drain terminal of the fourth PMOS tube, and a gate terminal of the sixth PMOS tube is connected to the source terminal of the first PMOS tube.

6. The active rectifier bridge circuit as in claim 1, wherein the gate drive part of the second PMOS power switch tube comprises: a fourth NMOS tube, a fifth NMOS tube, a sixth NMOS tube, a seventh PMOS tube, an eighth PMOS tube, a ninth PMOS tube, a tenth PMOS tube, an eleventh PMOS tube, and a twelfth PMOS tube, wherein a source terminal of the fourth NMOS tube, a source terminal of the fifth NMOS tube, and a source terminal of the sixth NMOS tube are all grounded, a gate terminal of the fourth NMOS tube is connected to the second output end of the alternating current level determining unit, a drain terminal of the fourth NMOS tube is connected to a drain terminal of the seventh PMOS tube, a gate terminal of the fifth NMOS tube is connected to a gate terminal of the sixth NMOS tube, and is simultaneously connected to the first output end of the alternating current level determining unit, a drain terminal of the fifth NMOS tube is connected to a drain terminal of the eighth PMOS tube, a drain terminal of the sixth NMOS tube is connected to a drain terminal of the ninth PMOS tube, a gate terminal of the seventh PMOS tube, a gate terminal of the eighth PMOS tube, and a gate terminal of the ninth PMOS tube are all connected to an output end of the PMOS voltage regulation part, and are controlled by the first bias current source, a source terminal of the seventh PMOS tube is connected to a drain terminal of the tenth PMOS tube, a source terminal of the eighth PMOS tube is connected to a drain terminal of the eleventh PMOS tube, a source terminal of the ninth PMOS tube is connected to a drain terminal of the twelfth PMOS tube, and is used as an output end of the gate drive part of the second PMOS power switch tube, a source terminal of the tenth PMOS tube, a source terminal of the eleventh PMOS tube, and a source terminal of the twelfth PMOS tube all access the direct current output voltage, a gate terminal of the tenth PMOS tube is connected to the drain terminal of the eleventh PMOS tube, a gate terminal of the eleventh PMOS tube is connected to the drain terminal of the tenth PMOS tube, and a gate terminal of the twelfth PMOS tube is connected to the source terminal of the seventh PMOS tube.

7. The active rectifier bridge circuit as in claim 1, wherein the gate drive unit of the NMOS power switch tube comprises: an NMOS voltage regulation part, a gate drive part of the first NMOS power switch tube, and a gate drive part of the second NMOS power switch tube, wherein the NMOS voltage regulation part is configured to provide a second clamping voltage for the gate drive part of the first NMOS power switch tube and the gate drive part of the second NMOS power switch tube;

the gate drive part of the first NMOS power switch tube is connected to the NMOS voltage regulation part, the alternating current level determining unit, the gate drive unit of the PMOS power switch tube, and the power switch tube rectification module, is controlled by the second bias current source, and is configured to: generate, based on the accessed second clamping voltage, the gate drive signal that turns off or on the first NMOS power switch tube, under the control of one of the control signals outputted by the second output end of the alternating current level determining unit and the gate drive signal of the second PMOS power switch tube outputted by the gate drive unit of the PMOS power switch tube; and the gate drive part of the second NMOS power switch tube is connected to the NMOS voltage regulation part, the alternating current level determining unit, the gate drive unit of the PMOS power switch tube, and the power switch tube rectification module, is controlled by the second bias current source, and is configured to: generate, based on the accessed second clamping voltage, the gate drive signal that turns off or on the second NMOS power switch tube, under the control of one of the control signals outputted by the fourth output end of the alternating current level determining unit and the gate drive signal of the first PMOS power switch tube outputted by the gate drive unit of the PMOS power switch tube.

8. The active rectifier bridge circuit as in claim 7, wherein the NMOS voltage regulation part comprises: a second voltage regulator tube, wherein an anode terminal of the second voltage regulator tube is grounded, and a cathode terminal of the second voltage regulator tube is used as an output end of the NMOS voltage regulation part.

9. The active rectifier bridge circuit as in claim 7, wherein the gate drive part of the first NMOS power switch tube comprises: a thirteenth PMOS tube, a seventh NMOS tube, an eighth NMOS tube, a ninth NMOS tube, a tenth NMOS tube, a third pull-up resistor, a third voltage regulator tube, a fourth voltage regulator tube, and a third phase inverter, wherein a gate terminal of the thirteenth PMOS tube accesses the gate drive signal of the second PMOS power switch tube outputted by the gate drive unit of the PMOS power switch tube, a source terminal of the thirteenth PMOS tube accesses the direct current output voltage, a drain terminal of the thirteenth PMOS tube is connected to a drain terminal of the seventh NMOS tube, a gate terminal of the seventh NMOS tube is connected to an output end of the NMOS voltage regulation part, and is controlled by the second bias current source, a source terminal of the seventh NMOS tube is connected to a drain terminal of the eighth NMOS tube, a cathode terminal of the third voltage regulator tube, an input end of the third phase inverter, a gate terminal of the ninth NMOS tube, and one end of the third pull-up resistor, a gate terminal of the eighth NMOS tube is connected to the second output end of the alternating current level determining unit, a source terminal of the eighth NMOS tube is grounded, an anode terminal of the third voltage regulator tube is grounded, an output end of the third phase inverter is connected to a gate terminal of the tenth NMOS tube, a drain terminal of the ninth NMOS tube is connected to the other end of the third pull-up resistor, and simultaneously accesses the second alternating current input voltage, a source terminal of the ninth NMOS tube is connected to a cathode terminal of the fourth voltage regulator tube and a drain terminal of the tenth NMOS tube, and is used as an output end of the gate drive part of the first NMOS power switch tube, and a source terminal of the tenth NMOS tube is grounded.

10. The active rectifier bridge circuit as in claim 7, wherein the gate drive part of the second NMOS power switch tube comprises: a fourteenth PMOS tube, an eleventh NMOS tube, a twelfth NMOS tube, a thirteenth NMOS tube, a fourteenth NMOS tube, a fourth pull-up resistor, a fifth voltage regulator tube, a sixth voltage regulator tube, and a fourth phase inverter, wherein a gate terminal of the fourteenth PMOS tube accesses the gate drive signal of the first PMOS power switch tube outputted by the gate drive unit of the PMOS power switch tube, a source terminal of the fourteenth PMOS tube accesses the direct current output voltage, a drain terminal of the fourteenth PMOS tube is connected to a drain terminal of the eleventh NMOS tube, a gate terminal of the eleventh NMOS tube is connected to an output end of the NMOS voltage regulation part, and is controlled by the second bias current source, a source terminal of the eleventh NMOS tube is connected to a drain terminal of the twelfth NMOS tube, a cathode terminal of the fifth voltage regulator tube, an input end of the fourth phase inverter, a gate terminal of the thirteenth NMOS tube, and one end of the fourth pull-up resistor, a gate terminal of the twelfth NMOS tube is connected to the fourth output end of the alternating current level determining unit, a source terminal of the twelfth NMOS tube is grounded, an anode terminal of the fifth voltage regulator tube is grounded, an output end of the fourth phase inverter is connected to a gate terminal of the fourteenth NMOS tube, a drain terminal of the thirteenth NMOS tube is connected to the other end of the fourth pull-up resistor, and simultaneously accesses the first alternating current input voltage, a source terminal of the thirteenth NMOS tube is connected to a cathode terminal of the sixth voltage regulator tube and a drain terminal of the fourteenth NMOS tube, and is used as an output end of the gate drive part of the second NMOS power switch tube, and a source terminal of the fourteenth NMOS tube is grounded.

11. An on-chip integrated system, comprising:
an active rectifier bridge circuit, comprising a bias module, a gate driver module, and a power switch tube rectification module,
wherein the bias module is configured to provide a first bias current source, a second bias current source, and an internal power supply for the gate driver module,
wherein the gate driver module is connected to the bias module, is controlled by the first bias current source, the second bias current source, and the internal power supply, and is configured to: process one group of alternating current input voltages to generate two groups of control signals that are mutually inverted, and generate four gate drive signals based on the two groups of control signals that are mutually inverted,
wherein the power switch tube rectification module is connected to the bias module and the gate driver module, comprises two NMOS power switch tubes and two PMOS power switch tubes, and is configured to: perform a turn-on or turn-off operation on the corresponding power switch tubes under the control of the four gate drive signals, and convert the one group of alternating current input voltages into a direct current output voltage for an output; and a functional circuit connected to an output end of the active rectifier bridge circuit, wherein the active rectifier bridge circuit provides the direct current output voltage as a working voltage for the functional circuit, and the active rectifier bridge circuit and the functional circuit are formed on the same silicon wafer;

the gate driver module comprises an alternating current level determining unit, a gate drive unit of the PMOS power switch tube, and a gate drive unit of the NMOS power switch tube, wherein the alternating current level determining unit is controlled by the internal power supply, and is configured to: compare a first alternating current input voltage with a second alternating current input voltage in the one group of alternating current input voltages, and perform logical operation processing on a comparison result and a delay of the comparison result, to generate the two groups of control signals that are mutually inverted;

the gate drive unit of each of the PMOS power switch tubes is connected to the alternating current level determining unit and the power switch tube rectification module, is controlled by the first bias current source, and is configured to: generate the gate drive signals of the two PMOS power switch tubes under the control of the two groups of control signals that are mutually inverted; and the gate drive unit of the NMOS power switch tube is connected to the alternating current level determining unit, the gate drive unit of the PMOS power switch tube, and the power switch tube rectification module, is controlled by the second bias current source, and is configured to generate the gate drive signals of the two NMOS power switch tubes under the control of the two groups of control signals that are mutually inverted and the gate drive signals of the two PMOS power switch tubes;

the gate drive unit of the PMOS power switch tube comprises: a PMOS voltage regulation part, a gate drive part of a first PMOS power switch tube, and a gate drive part of a second PMOS power switch tube, wherein the PMOS voltage regulation part is configured to provide a first clamping voltage for the gate drive part of the first PMOS power switch tube and the gate drive part of the second PMOS power switch tube;

the gate drive part of the first PMOS power switch tube is connected to the PMOS voltage regulation part, the alternating current level determining unit, and the power switch tube rectification module, is controlled by the first bias current source, and is configured to: generate, based on the accessed direct current output voltage, the gate drive signal that turns off the first PMOS power switch tube, or generate, based on the accessed first clamping voltage, the gate drive signal that turns on the first PMOS power switch tube, under the control of the one group of control signals that are mutually inverted and that are outputted by a third output end and a fourth output end of the alternating current level determining unit; and the gate drive part of the second PMOS power switch tube is connected to the PMOS voltage regulation part, the alternating current level determining unit, and the power switch tube rectification module, is controlled by the first bias current source, and is configured to: generate, based on the accessed direct current output voltage, the gate drive signal that turns off the second PMOS power switch tube, or generate, based on the accessed first clamping voltage, the gate drive signal that turns on the second PMOS power switch tube, under the control of the one group of control signals that are mutually inverted and that are outputted by a first output end and a second output end of the alternating current level determining unit.

* * * * *